US012624819B1

(12) United States Patent
Ling et al.

(10) Patent No.: US 12,624,819 B1
(45) Date of Patent: May 12, 2026

(54) LENS ARRAYS IN LIGHT-EMITTING DIODE PACKAGES

(71) Applicant: CreeLED, Inc., Durham, NC (US)

(72) Inventors: Timothy Ling, Raleigh, NC (US); Ryan Mohn, Mebane, NC (US); David Suich, Durham, NC (US)

(73) Assignee: CreeLED, Inc., Durham, NC (US)

( * ) Notice: Subject to any disclaimer, the term of this patent is extended or adjusted under 35 U.S.C. 154(b) by 0 days.

(21) Appl. No.: 19/093,896

(22) Filed: Mar. 28, 2025

(51) Int. Cl.

| | |
|---|---|
| ***F21V 5/00*** | (2018.01) |
| ***F21Y 105/10*** | (2016.01) |
| ***F21Y 113/00*** | (2016.01) |
| ***F21Y 115/10*** | (2016.01) |

(52) U.S. Cl.
CPC .......... *F21V 5/007* (2013.01); *F21Y 2105/10* (2016.08); *F21Y 2113/00* (2013.01); *F21Y 2115/10* (2016.08)

(58) Field of Classification Search
CPC ............ F21Y 2105/12; F21Y 2105/16; F21Y 2113/13; F21Y 115/10; F21K 9/64; F21V 15/01; F21V 3/12; F21V 31/005; F21V 5/007; F21V 5/04; F21V 5/10
See application file for complete search history.

(56) References Cited

U.S. PATENT DOCUMENTS

| | | | | |
|---|---|---|---|---|
| 7,344,902 | B2 * | 3/2008 | Basin | H10H 20/853 257/E33.059 |
| 9,893,243 | B2 * | 2/2018 | West | H10H 20/8512 |
| 10,290,777 | B2 * | 5/2019 | Andrews | H10H 20/857 |

* cited by examiner

*Primary Examiner* — William J Carter
(74) *Attorney, Agent, or Firm* — Withrow & Terranova, P.L.L.C.

(57) ABSTRACT

Light-emitting diode (LED) devices and more particularly lens arrays in LED packages are disclosed. Lens arrays include one or more lens shapes positioned to receive light from LED chip arrays. Individual lenses of lens arrays may be separately formed in LED packages on various surfaces, such as on top surfaces of encapsulant layers that cover LED chip arrays. Shapes of individual lenses may be tailored to provide various emission patterns. Exemplary lens arrays in LED packages include all lenses of a same shape or variably shaped lenses within a same lens array. Differently shaped lenses may be arranged over LED chips of a same serially connected string so that emission patterns and/or colors may be dynamically adjusted during operation.

18 Claims, 6 Drawing Sheets

LENS ARRAYS IN LIGHT-EMITTING DIODE PACKAGES

FIELD OF THE DISCLOSURE

The present disclosure relates to light-emitting diode (LED) devices, and more particularly to lens arrays in LED packages.

BACKGROUND

Solid-state lighting devices such as light-emitting diodes (LEDs) are increasingly used in both consumer and commercial applications. Advancements in LED technology have resulted in highly efficient and mechanically robust light sources with a long service life. Accordingly, modern LEDs have enabled a variety of new applications, including LED displays and lighting devices for general illumination.

LEDs are solid-state devices that convert electrical energy to light and generally include one or more active layers of semiconductor material (or an active region) arranged between oppositely doped n-type and p-type layers. When a bias is applied across the doped layers, holes and electrons are injected into the one or more active layers where they recombine to generate emissions such as visible light or ultraviolet emissions. An LED chip typically includes an active region that may be fabricated, for example, from gallium nitride, gallium phosphide, aluminum nitride, indium nitride, gallium-indium-based materials, gallium arsenide-based materials, and/or from organic semiconductor materials.

LED packages have been developed that provide mechanical support, electrical connections, and encapsulation for LED emitters. LED packages with arrays of LED chips, such as chip-on-board LED packages, have been developed for applications needing high light output and high lumen density. As LED technology continues to be developed for ever-evolving modern applications, challenges exist in keeping up with operating demands for LED packages and related elements of LED packages.

The art continues to seek improved LEDs and solid-state lighting devices having desirable illumination characteristics capable of overcoming challenges associated with conventional lighting devices.

SUMMARY

The present disclosure relates to light-emitting diode (LED) devices, and more particularly to lens arrays in LED packages. Lens arrays include one or more lens shapes positioned to receive light from LED chip arrays. Individual lenses of lens arrays may be separately formed in LED packages on various surfaces, such as on top surfaces of encapsulant layers that cover LED chip arrays. Shapes of individual lenses may be tailored to provide various emission patterns. Exemplary lens arrays in LED packages include all lenses of a same shape or variably shaped lenses within a same lens array. Differently shaped lenses may be arranged over LED chips of a same serially connected string so that emission patterns and/or colors may be dynamically adjusted during operation.

In one aspect, an LED package comprises: a submount; an array of LED chips on the submount; an encapsulant on the submount and covering the array of LED chips; and an array of lenses on a top surface of the encapsulant. The LED package may further comprise a light-altering material on the submount, the light-altering material extending about a perimeter of the array of LED chips to form a dam for retaining the encapsulant. In certain embodiments, the array of lenses is formed on the top surface of the encapsulant above the array of LED chips. In certain embodiments, the encapsulant comprises a first silicone, and the array of lenses comprises a second silicone that is different than the first silicone. In certain embodiments, the first silicone comprises a lower coefficient of thermal expansion than the second silicone. In certain embodiments, each discrete lens of the array of lenses is provided on a different portion of the encapsulant relative to a corresponding LED chip of the array of LED chips. The LED package may further comprise a lumiphoric material configured to convert at least a portion of light generated by at least one LED chip of the array of LED chips. In certain embodiments, the lumiphoric material is provided within the encapsulant with an increased concentration along a top surface of the submount and along a top surface of the array of LED chips relative to the top surface of the encapsulant. In certain embodiments, the lumiphoric material comprises a pre-formed structure that is attached to the at least one LED chip of the array of LED chips. In certain embodiments, a first lens of the array of lenses forms a first shape with a lens width that decreases in a direction toward the encapsulant, and the first shape further comprises an inward depression in a direction toward a first LED chip of the array of LED chips.

In another aspect, an LED package comprises: a submount; an array of LED chips on the submount, the array of LED chips comprising a first LED chip and a second LED chip; an encapsulant on the submount and covering the array of LED chips, a first portion of a top surface of the encapsulant being vertically registered with the first LED chip relative to the submount, and a second portion of the top surface of the encapsulant being vertically registered with the second LED chip relative to the submount; and a first lens on the first portion of the top surface of the encapsulant, and the second portion of the top surface of the encapsulant being devoid of any lens. In certain embodiments, the first lens is centered with respect to the first LED chip. In certain embodiments, the first LED chip is configured to be independently addressable with respect to the second LED chip.

In another aspect, an LED package comprises: a submount; an array of LED chips on the submount, the array of LED chips comprising a first LED chip and a second LED chip; an encapsulant on the submount and covering the array of LED chips, a first portion of a top surface of the encapsulant being vertically registered with the first LED chip relative to the submount, and a second portion of the top surface of the encapsulant being vertically registered with the second LED chip relative to the submount; a first lens on the first portion of the top surface of the encapsulant, the first lens forming a first shape; and a second lens on the second portion of the top surface of the encapsulant, the second lens forming a second shape that is different than the first shape. In certain embodiments, the first shape comprises a lens width that decreases in a direction toward the first portion of the top surface of the encapsulant. In certain embodiments, the first shape further comprises an inward depression in a direction toward the first LED chip. In certain embodiments, the first shape comprises a lens width that decreases in a direction toward the first portion of the top surface of the encapsulant, and the second shape is hemispherical. The LED package may further comprise: a third LED chip of the array of LED chips; and a third lens on a third portion of the top surface of the encapsulant that is vertically registered with the third LED chip, wherein the third lens forms a third shape that is different than the first shape and the second shape. In certain embodiments, the first LED chip, the second LED chip, and the third LED chip are individually addressable with respect to one another. The LED package may further comprise a third LED chip of the array of LED chips, wherein the second lens is further on a third portion of the top surface of the encapsulant that is vertically registered with the third LED chip.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
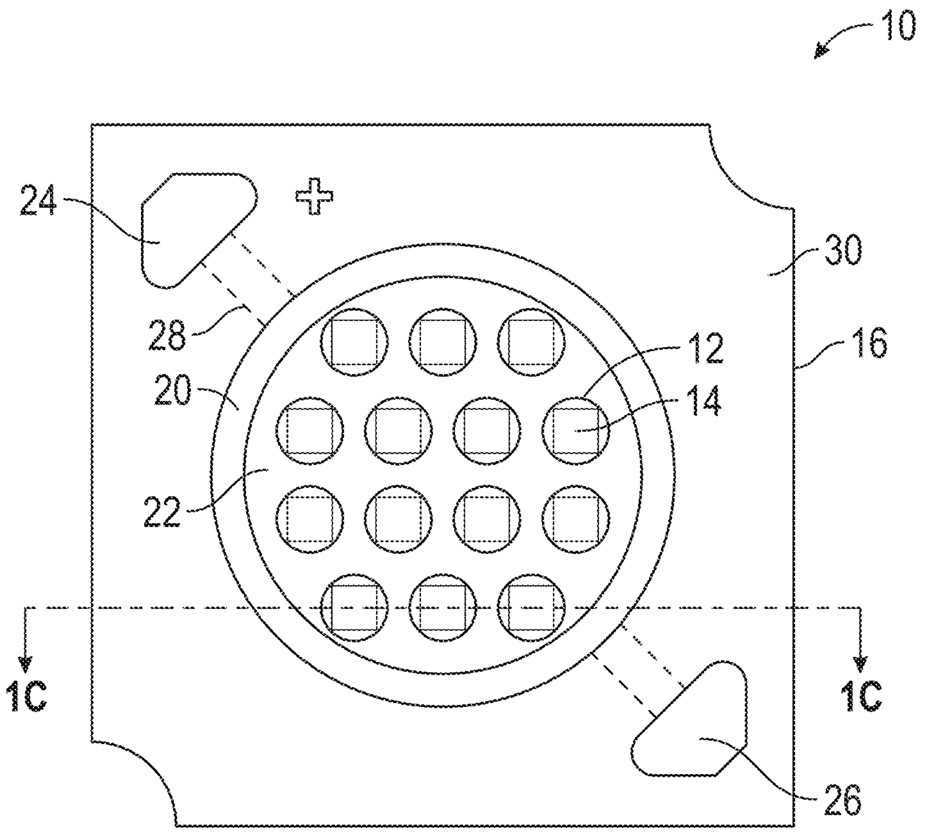
FIG. 1A is a top view of a light-emitting diode (LED) package with an array of lenses according to aspects of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to light-emitting diode (LED) devices, and more particularly to lens arrays in LED packages. Lens arrays include one or more lens shapes positioned to receive light from LED chip arrays. Individual lenses of lens arrays may be separately formed in LED packages on various surfaces, such as on top surfaces of encapsulant layers that cover LED chip arrays. Shapes of individual lenses may be tailored to provide various emission patterns. Exemplary lens arrays in LED packages include all lenses of a same shape or variably shaped lenses within a same lens array. Differently shaped lenses may be arranged over LED chips of a same serially connected string so that emission patterns and/or colors may be dynamically adjusted during operation.

Before delving into specific details of various aspects of the present disclosure, an overview of various elements that may be included in exemplary LED packages of the present disclosure is provided for context. An LED chip typically comprises an active LED structure or region that can have many different semiconductor layers arranged in different ways. The fabrication and operation of LEDs and their active structures are generally known in the art and are only briefly discussed herein. The layers of the active LED structure can be fabricated using known processes with a suitable process being fabrication using metal organic chemical vapor deposition. The layers of the active LED structure may comprise many different layers and generally comprise an active layer sandwiched between n-type and p-type oppositely doped epitaxial layers, all of which are formed successively on a growth substrate. It is understood that additional layers and elements can also be included in the active LED structure, including, but not limited to, buffer layers, nucleation layers, super lattice structures, undoped layers, cladding layers, contact layers, and current-spreading layers and light extraction layers and elements. The active layer can comprise a single quantum well, a multiple quantum well, a double heterostructure, or super lattice structures.

The active LED structure can be fabricated from different material systems, with some material systems being Group III nitride-based material systems. Group III nitrides refer to those semiconductor compounds formed between nitrogen (N) and the elements in Group III of the periodic table, usually aluminum (Al), gallium (Ga), and indium (In). Gallium nitride (GaN) is a common binary compound. Group III nitrides also refer to ternary and quaternary compounds such as aluminum gallium nitride (AlGaN), indium gallium nitride (InGaN), and aluminum indium gallium nitride (AlInGaN). Other material systems include organic semiconductor materials, and other Group III-V systems such as gallium phosphide (GaP), gallium arsenide (GaAs), and related compounds. The active LED structure may be grown on a growth substrate that can include many materials, such as sapphire, silicon carbide (SiC), silicon, aluminum nitride (AlN), and GaN.

The active LED structure for a given LED chip may be configured to generate certain wavelengths of light depending on the composition of the active layer. In certain embodiments, the active LED structure is configured to generate blue light with a peak wavelength range of approximately 430 nanometers (nm) to 480 nm. In other embodiments, the active LED structure generates green light with a peak wavelength range of 500 nm to 570 nm. In other embodiments, the active LED structure generates red light with a peak wavelength range of 600 nm to 700 nm. In certain embodiments, the active LED structure may be configured to generate light that is outside the visible spectrum, including one or more portions of the ultraviolet (UV) spectrum, or one or more portions of the near infrared spectrum, and/or the infrared spectrum (e.g., 700 nm to 1000 nm). In other applications, UV LEDs may also be provided with one or more lumiphoric materials to provide LED packages with aggregated emissions having a broad spectrum and improved color quality for visible light applications. In various applications, LED packages according to the present disclosure may include arrays of LED chips. In certain embodiments, an LED array within an LED package may include all LED chips of a same emission color. In other embodiments, multiple strings of LED chips having different emission colors may be arranged together to form an LED array.

In certain embodiments, aspects of the present disclosure may be applicable to LED packages with a recipient lumiphoric material that converts at least a portion of light generated from one or more LED chips to a different wavelength. For example, an LED chip may be covered with one or more lumiphoric materials (also referred to herein as lumiphors), such as phosphors, such that at least some of the light from the LED chip is absorbed by the one or more lumiphors and is converted to one or more different wavelength spectra according to the characteristic emission from the one or more lumiphors. In this regard, at least one lumiphor receiving at least a portion of the light generated by the LED chip may re-emit light having a different peak wavelength than the LED chip. An LED chip or an LED chip array and one or more lumiphoric materials may be selected such that their combined output results in light with one or more desired characteristics such as color, color point, intensity, etc. In certain embodiments, aggregate emissions of LED chips, optionally in combination with one or more lumiphoric materials, may be arranged to provide cool white, neutral white, or warm white light, such as within a color temperature range of 2,500 Kelvin (K) to 10,000 K. In certain embodiments, lumiphoric materials having cyan, green, amber, yellow, orange, and/or red peak emission wavelengths may be used. In some embodiments, the combination of the LED chip and the one or more lumiphors (e.g., phosphors) emits a generally white combination of light. The one or more phosphors may include yellow (e.g., YAG:Ce), green (e.g., LuAg:Ce), and red (e.g., $Ca_{i-x-y}Sr_x$-$Eu_yAlSiN_3$) emitting phosphors, and combinations thereof.

Lumiphoric materials as described herein may be or include one or more of a phosphor, a scintillator, a lumiphoric ink, a quantum dot material, and the like. One or more lumiphoric materials may be provided on one or more portions of an LED chip in various configurations. For example, lumiphoric materials may be provided by direct coating on one or more surfaces of an LED chip, dispersal in an encapsulant material configured to cover one or more LED chips, as part of a cover structure with a coating on one or more optical or support elements (e.g., by powder coating, inkjet printing, or the like), and/or being incorporated within a cover structure, such as pre-formed phosphor-in-glass or phosphor-in-silicone structures, ceramic phosphor plates, and/or single crystal phosphors. In certain embodiments, lumiphoric materials may be downconverting or upconverting, and combinations of both downconverting and upconverting materials may be provided. In certain embodiments, multiple different (e.g., compositionally different) lumiphoric materials arranged to produce different peak wavelengths may be arranged to receive emissions from one or more LED chips.

As used herein, a layer or region of a light-emitting device may be considered to be "transparent" when at least 80% of emitted radiation that impinges on the layer or region emerges through the layer or region. Moreover, as used herein, a layer or region of an LED is considered to be "reflective" or embody a "mirror" or a "reflector" when at least 80% of the emitted radiation that impinges on the layer or region is reflected. In some embodiments, the emitted radiation comprises visible light such as blue and/or green LEDs with or without lumiphoric materials. In other embodiments, the emitted radiation may comprise nonvisible light. For example, in the context of GaN-based blue and/or green LEDs, silver (Ag) may be considered a reflective material (e.g., at least 80% reflective).

The present disclosure can be useful for LED chips having a variety of geometries, such as vertical geometry or lateral geometry. A vertical geometry LED chip typically includes anode and cathode connections on opposing sides or faces of the LED chip, and a wire bond is typically used for top-side electrical connections. A lateral geometry LED chip typically includes both anode and cathode connections on the same side of the LED chip that is opposite a substrate, such as a growth substrate. In certain embodiments, a lateral geometry LED chip may be mounted on a submount of an LED package such that the anode and cathode connections are on a face of the LED chip that is opposite the submount. In this configuration, wire bonds may be used to provide electrical connections with the anode and cathode connections. In other embodiments, a lateral geometry LED chip may be flip-chip mounted on a surface of a submount of an LED package such that the anode and cathode connections are on a face of the active LED structure that is adjacent to the submount. In this configuration, electrical traces or patterns may be provided on the submount for providing electrical connections to the anode and cathode connections of the LED chip. In a flip-chip configuration, the active LED structure is configured between the substrate of the LED chip and the submount for the LED package. Accordingly, light emitted from the active LED structure may pass through the substrate in a desired emission direction. In other embodiments, an active LED structure may be bonded to a carrier submount, and the growth substrate may be removed such that light may exit the active LED structure without passing through the growth substrate.

According to aspects of the present disclosure, LED packages may include one or more elements, such as lumiphoric materials, encapsulants, light-altering materials, lenses, and electrical contacts, among others that are provided with one or more LED chips. In certain aspects, an LED package may include a support structure or element, such as a lead frame structure or a submount.

Submount structures typically include submounts with electrically conductive traces. Exemplary submount materials include ceramic materials such as aluminum oxide or alumina, AlN, or organic insulators like polyimide (PI) and polyphthalamide (PPA). In certain embodiments, submounts may comprise a printed circuit board (PCB), sapphire, Si or any other suitable material. For PCB embodiments, different PCB types can be used such as standard FR-4 PCB, metal core PCB, or any other type of PCB. Light-altering materials may be arranged within LED packages to reflect or otherwise redirect light from the one or more LED chips in a desired emission direction or pattern. For chip-on-board LED packages, light-altering materials may form a dam about a perimeter of an array of LED chips, and an encapsulant material may be formed to cover the LED chips and be retained by the dam. In certain embodiments, one or more lumiphoric materials, such as phosphor particles, may be integrated or otherwise embedded within the encapsulant material.

Light-altering materials may be arranged within LED packages to reflect or otherwise redirect light from the one or more LED chips in a desired emission direction or pattern. As used herein, light-altering materials may include many different materials including light-reflective materials that reflect or redirect light, light-absorbing materials that absorb light, and materials that act as a thixotropic agent. As used herein, the term "light-reflective" refers to materials or particles that reflect, refract, scatter, or otherwise redirect light. For light-reflective materials, the light-altering material may include at least one of fused silica, fumed silica, titanium dioxide ($TiO_2$), or metal particles suspended in a binder, such as silicone or epoxy. For light-absorbing materials, the light-altering material may include at least one of carbon, silicon, or metal particles suspended in a binder, such as silicone or epoxy. The light-reflective materials and the light-absorbing materials may comprise nanoparticles. In certain embodiments, the light-altering material may comprise a generally white color to reflect and redirect light. In other embodiments, the light-altering material may comprise a generally opaque color, such as black or gray for absorbing light and increasing contrast. In certain embodiments, the light-altering material includes both light-reflective material and light-absorbing material suspended in a binder.

In conventional LED packages, lenses are typically formed by a molding process that provides a lens shape on the support structure. The molding process may include confining an encapsulant material to the shape of a lens with a mold block, curing of the encapsulant material, followed by removal of the mold block. In such applications, the shape of the lens may form various shapes, such as domes or hemispherical lenses. For LED packages with large arrays of LED chips, such as chip-on-board applications, the large area of the array provides challenges for molding large area lens structures. Accordingly, conventional chip-on-board LED packages typically include a generally flat encapsulant that is retained by the dam of light-altering material.

According to aspects of the present disclosure, lens arrays are provided over LED chip arrays in LED packages. Discrete lens shapes may be formed over individual LED chips or groupings of LED chips of the larger array. For example, an LED package may include an array of LED chips on a submount, a light-altering material forming a dam on the submount and around a perimeter of the array of LED chips, an encapsulant retained by the dam, and an array of lens structures on the encapsulant and over the array of LED chips. Lens structures may be formed by self-doming techniques on a top surface of the encapsulant, where lens materials are provided with increased thixotropic properties and/or viscosity. Such lens materials may be manipulated by dispensing conditions to achieve desired shapes for targeted emission profiles before curing. For example, lens arrays may be dispensed to form various shapes, such as dome or hemispherical lens shapes over one or more LED chips. Accordingly, the array of lenses may provide larger area chip-on-board LED packages with optical profiles similar to domed LED packages, which may be beneficial in a variety of applications, such as high-powered LED torch devices.

Additional lens shapes include oval-shaped perimeters and bullet shapes, among others. Since the lens materials may hold their shape for curing without conventional molds, shape limitations associated with mold release may be avoided. In certain aspects, a complex lens shape includes a lens with sides that inwardly taper toward the top surface of the encapsulant with a shape not possible with conventional molding. In further aspects, a complex lens shape may include an inward dimple or depression formed in a top surface thereof. The amount of inward tapering and/or dimensions of the inward dimple may be tailored to achieve desired emission patterns of the LED package. In certain aspects, emission patterns may be tailored to provide wider emission angles than conventional LED packages with dome lenses.

Figure 1B:
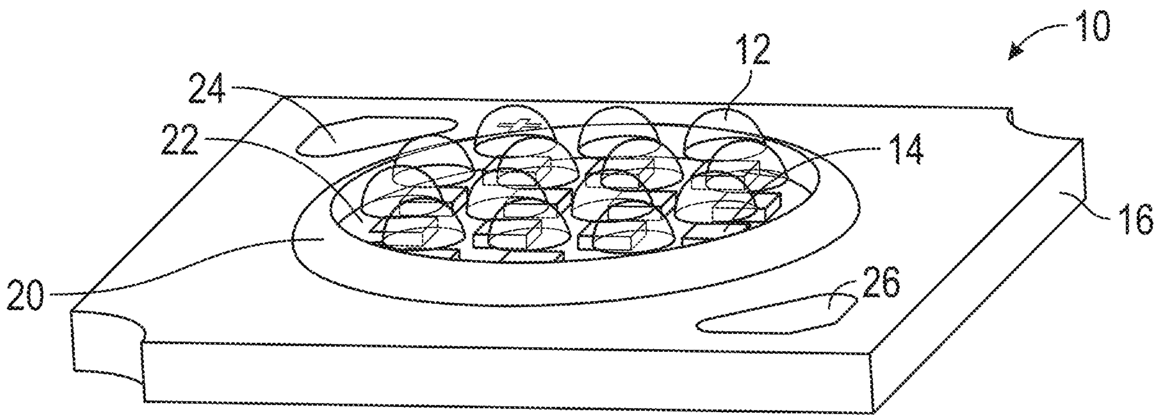
FIG. 1B is a top perspective view of the LED package of FIG. 1B.

FIG. 1A is a top view of an LED package 10 with an array of lenses 12 according to aspects of the present disclosure. FIG. 1B is a top perspective view of the LED package 10 of FIG. 1B. The LED package 10 includes a chip-on-board structure where an array of LED chips 14 are mounted on a top surface of a submount 16. A light-altering material 20 is positioned on the submount 16 and forms a dam structure, such as a raised ring, about a periphery of the array of LED chips 14. In certain embodiments, the light-altering material 20 forms a reflective structure for redirecting laterally propagating light from the LED chips 14, thereby defining a light-emitting surface of the LED package 10. By way of example, the light-altering material 20 may include a material, such as $TiO_2$ particles in a binder of silicone, that forms a generally white color. An encapsulant 22 may be retained within a boundary of the light-altering material such that the encapsulant 22 covers the LED chips 14. In certain embodiments, the encapsulant 22 may include lumiphoric materials configured to provide wavelength conversion for at least a portion of light generated by the LED chips 14. The LED chips 14 are electrically connected to package bond pads 24, 26 on the top surface of the submount 16 by way of one or more electrically conductive traces 28. A reflective coating 30, such as a solder mask, may cover portions of the submount 16 outside of the light-altering material 20 while leaving the package bond pads 24, 26 uncovered. Accordingly, the reflective coating 30 may cover portions of the electrically conductive traces 28. For illustrative purposes, outlines of such covered electrically conductive traces 28 are shown with dashed lines in FIG. 1A and omitted in FIG. 1B.

As illustrated in FIGS. 1A and 1B, a discrete lens 12 is provided for each LED chip 14 for individually tailoring an emission pattern for each LED chip 14. The array of lenses 12 may be provided on a top surface of the encapsulant 22. In certain embodiments, the shape of each lens 12 may be self-formed on the top surface of the encapsulant 22. For example, a material for the lenses 12 may be selected with thixotropic properties and/or a viscosity that promotes self-formed shapes by dispensing over each LED chip 14. Additionally, the material of the encapsulant 22 may have a lower coefficient of thermal expansion than the lenses 12 to provide increased softness and buffering of the LED chips 14 and corresponding electrical connections during heat cycling. In certain embodiments, the encapsulant 22 comprises a first silicone and the lenses 12 comprise a second silicone, with the second silicone having increased thixotropic properties and/or viscosity relative to the first silicone, and the first silicone having a lower coefficient of thermal expansion than the second silicone. Accordingly, the encapsulant 22 may be dispensed to have a generally flat top surface within the boundary of the light-altering material 20, while the lenses 12 maintain curved shapes, such as dome or hemispherical, before being cured in place. In certain embodiments, each discrete lens 12 of the array is positioned or registered on a different portion of the encapsulant 22 relative to a corresponding LED chip 14 of the array.

Figure 1C:
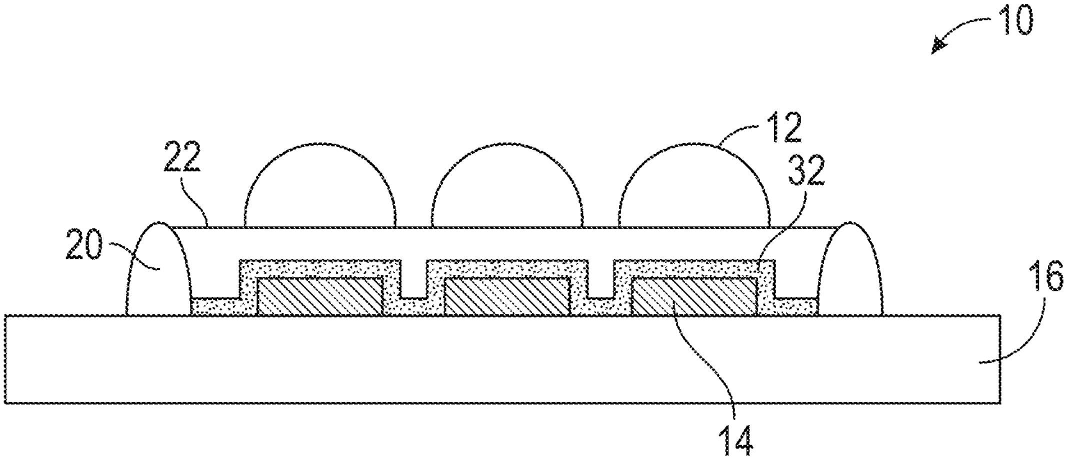
FIG. 1C is a cross-sectional view of the LED package of FIG. 1A taken along the sectional line 1C-1C of FIG. 1A.

FIG. 1C is a cross-sectional view of the LED package 10 of FIG. 1A taken along the sectional line 1C-1C of FIG. 1A. As illustrated, each lens 12 is positioned or registered above a corresponding one of the LED chips 14. A portion of the encapsulant 22 separates the lenses 12 from corresponding LED chips 14. For white light applications, a lumiphoric material 32 may be provided within the encapsulant 22 for providing wavelength conversion on at least a portion of light generated by the LED chips 14. In certain embodiments, the lumiphoric material 32 may be intermixed within the encapsulant 22 and permitted to settle along the LED chips 14 and the top surface of the submount 16 before curing. Accordingly, the distribution of the lumiphoric material 32 may be provided with an increased concentration along a top surface of the submount 16 and along a top surface of the array of LED chips 14 relative to the top surface of the encapsulant 22. For other applications, the lumiphoric material 32 may be omitted.

Figure 2:
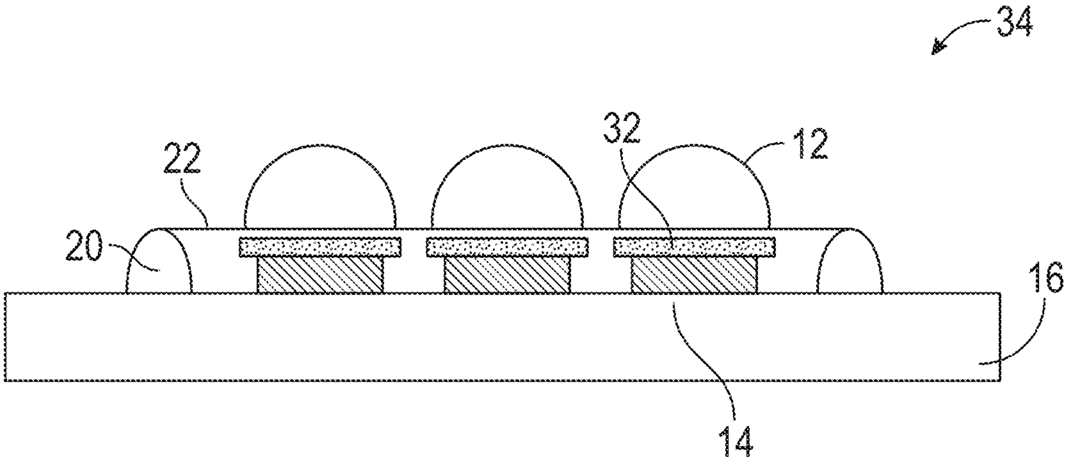
FIG. 2 is a cross-sectional view of an LED package similar to the LED package of FIGS. 1A to 1C for embodiments where the array of lenses is positioned closer to the LED chips.

FIG. 2 is a cross-sectional view of an LED package 34 similar to the LED package 10 of FIGS. 1A to 1C for embodiments where the array of lenses 12 is positioned closer to the LED chips 14. A height of the light-altering material may be reduced as compared with the LED package 10 of FIGS. 1A to 1C, thereby reducing an amount of the encapsulant 22 that separates the array of lenses 12 from the LED chips 14. Accordingly, increased light from each LED chip 14 may be shaped from corresponding lenses 12. For embodiments that include the lumiphoric material 32, the lumiphoric material 32 may be provided in the form of a cover structure or wavelength conversion element that is preformed and subsequently attached each LED chip 14. For such embodiments, the lumiphoric material 32 may formed as a phosphor-in-glass structure, a preformed phosphor-in-silicone structure, a ceramic phosphor plate, or a single crystal phosphor. In certain embodiments, each LED chip 14 may be covered with a separate lumiphoric material 32.

Figure 3:
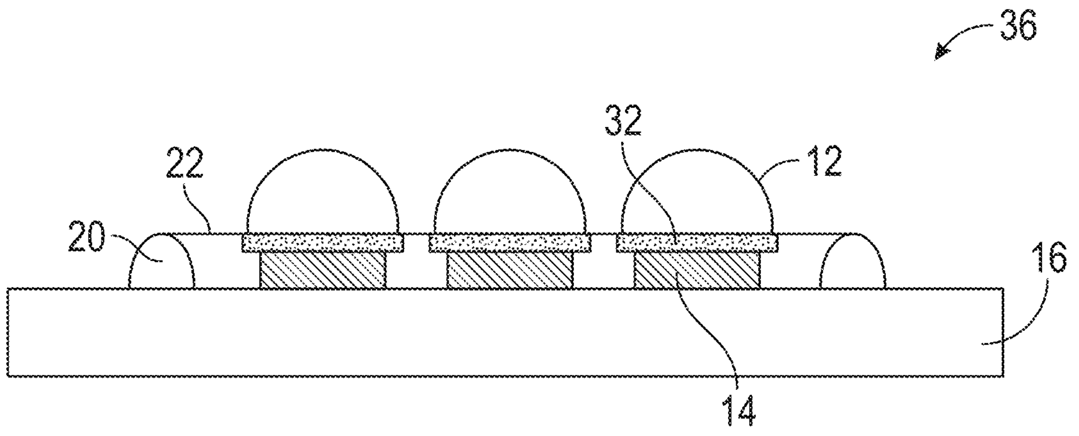
FIG. 3 is a cross-sectional view of an LED package similar to the LED package of FIG. 2 for embodiments where the array of lenses is positioned even closer to the LED chips.

FIG. 3 is a cross-sectional view of an LED package 36 similar to the LED package 34 of FIG. 2 for embodiments where the array of lenses 12 is positioned even closer to the LED chips 14. As illustrated, the height of the light-altering material 20 may be reduced even further as compared with the LED package 34 of FIG. 2, thereby positioning a top surface of the encapsulant 22 close to or coplanar with a top surface of the lumiphoric material 32. Accordingly, the lenses 12 may be positioned on the lumiphoric material 32 of each LED chip 14 without intervening material of the encapsulant 22 in certain embodiments.

Figure 4:
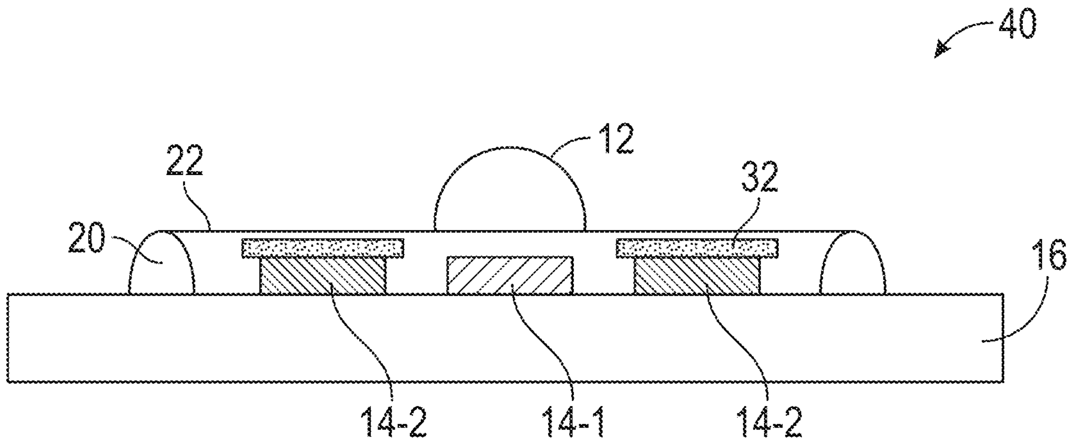
FIG. 4 is a cross-sectional view of an LED package similar to the LED package of FIG. 2 for embodiments where lenses are only positioned on certain LED chips of the array.

FIG. 4 is a cross-sectional view of an LED package 40 similar to the LED package 34 of FIG. 2 for embodiments where lenses 12 are only positioned on certain LED chips 14-1 of an array of LED chips 14-1 to 14-2. By way of example, the LED chip 14-1 may embody a monochromatic emitter without a lumiphoric material directly above it, and lumiphoric materials 32 are positioned for wavelength conversion of at least a portion of light generated by the LED chips 14-2. The lens 12 is on a first portion of a top surface of the encapsulant 22 that is vertically registered with the LED chip 14-1 with respect to the submount 16, while a second portion of the top surface of the encapsulant 22 that is vertically registered with the LED chips 14-2 is devoid of a corresponding lens. As used herein, vertically registered with respect to the submount 16 refers to an arrangement where a vertical line from a horizontal surface of the submount 16 where the LED chip 14-1 is mounted would intersect a portion of the top surface of the encapsulant 22 and/or lens 12. In still further embodiments, the lens 12 may be vertically registered and centered over the LED chip 14-1. In such an example, the lens 12 may effectively provide a wider emission pattern for spreading light from the LED chip 14-1 for mixing with light from the LED chips 14-2 in aggregate emissions leaving the LED package 40. In certain embodiments, the LED chip 14-1 may be electrically connected to be independently addressable relative to the LED chips 14-2. Accordingly, a ratio of light from the wider emissions provided by the LED chip 14-1 and corresponding lens 12 may be dynamically adjusted to change color and/or far-field patterns in aggregate emissions of light from the LED package 40.

Figure 5:
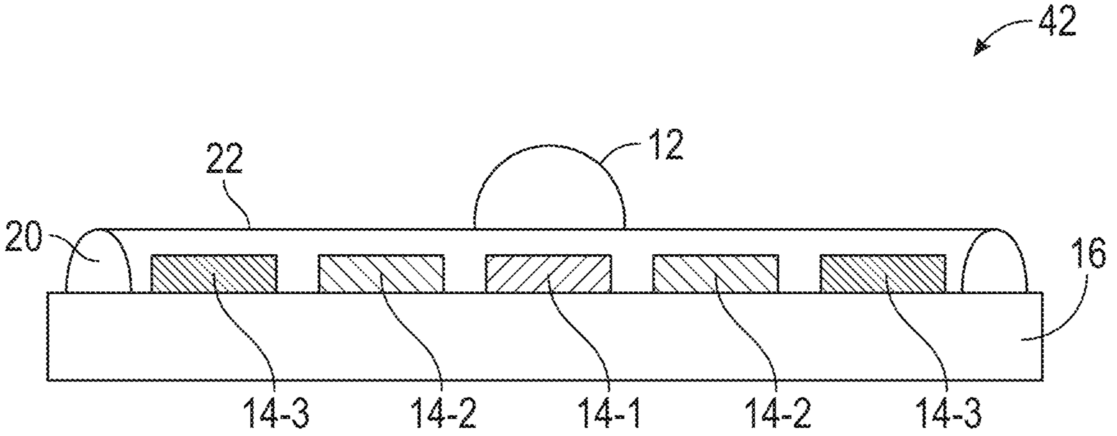
FIG. 5 is a cross-sectional view of an LED package similar to the LED package of FIG. 4 for embodiments with additional LED chips.

FIG. 5 is a cross-sectional view of an LED package 42 similar to the LED package 40 of FIG. 4 for embodiments with additional LED chips 14-1 to 14-3. In certain embodiments, the LED chips 14-1 to 14-3 are configured to generate different wavelengths of light, such as green for the LED chips 14-1, red for the LED chips 14-2, and blue for the LED chips 14-3. In certain embodiments, no lumiphoric material is provided. Green LED chips are known to be more sensitive to the human eye than blue LED chips and/or red LED chips. Accordingly, less light from the LED chip 14-1 is needed to achieve intended color points. By positioning the lens 12 to be vertically registered with the LED chip 14-1, green light may have a wider distribution for intermixing with neighboring LED chips 14-2 and 14-3 of other colors. This may further permit reducing a number of the LED chips 14-1 relative to the LED chips 14-2 and 14-3 while still providing suitable color mixing. The LED chip 14-1 in the cross-section of FIG. 5 may represent one of a serial string of LED chips 14-1. Moreover, the LED chips 14-2 may be serially connected in a separate string, and the LED chips 14-3 may be serial connected in a separate string. Such an arrangement provides individual addressability for each color for dynamically adjusting color and/or far-field patterns in aggregate emissions of light from the LED package 42.

Figure 6:
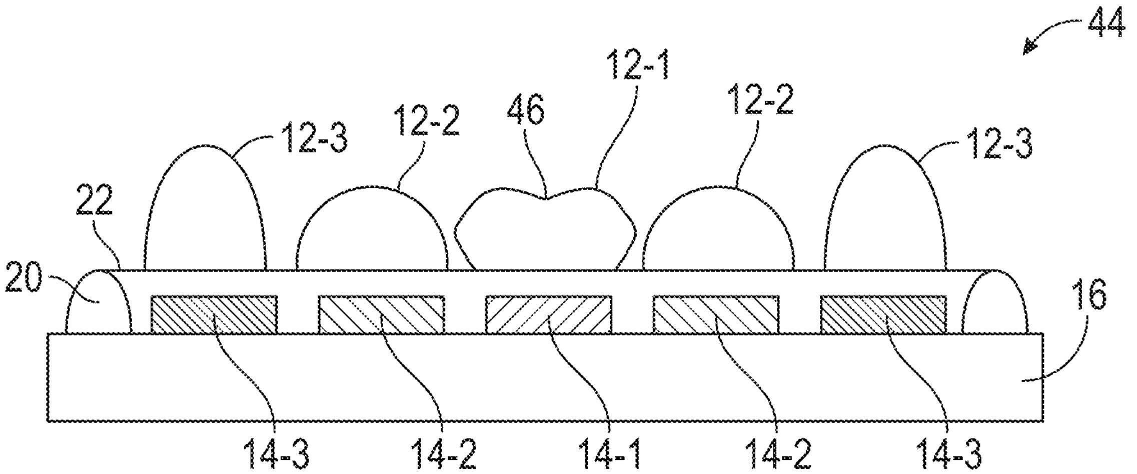
FIG. 6 is a cross-sectional view of an LED package similar to the LED package of FIG. 5 for embodiments that include lenses of different shapes.

FIG. 6 is a cross-sectional view of an LED package 44 similar to the LED package 42 of FIG. 5 for embodiments that include lenses 12-1 to 12-3 of different shapes. In certain embodiments, the lens 12-1 for the LED chip 14-1 may be formed with a shape tailored for providing a wider emission pattern of light than the other lenses 12-2, 12-3. By way of example, the lens 12-1 may have a width that is widest in a middle portion of the lens 12-1 that is spaced from the top surface of the encapsulant 22. The width of the lens 12-1 may inwardly taper in a direction toward the encapsulant 22. The lens 12-1 may further include a dimple or inward depression 46 in a surface of the lens 12-1. The depression 46 may form an inwardly curved surface that is effectively centered with respect to the LED chip 14-1. In this manner, increased light emissions that are normal to surface of the LED chip 14-1 may be redirected to wider angle emissions. From the cross-sectional view of FIG. 6, the lens 12-1 may appear as a dual-dome lens with peaks of increased thickness on either side of the depression 46. In certain embodiments, the depression 46 may form a generally circular shape that is centrally located about the lens 12-1, such that the peaks of increased thickness visible in FIG. 6 represent a continuous ring that extends about and defines a perimeter boundary of the depression 46. The lenses 12-2 for the LED chips 14-2 may have generally hemispherical shapes, while the lenses 12-3 for the LED chips 14-3 may have generally bullet shapes.

As described above, the material of the lenses 12-1 to 12-3 may be provided with increased thixotropic properties and/or viscosity. In this manner, the material of each lens 12-1 to 12-3 is provided with sufficiently high viscosity to permit each lens 12-1 to 12-3 to have a dispensed shape that is retained before curing. For example, the material of the lens 12-1 may be dispensed with increased pressure through a nozzle with a narrow orifice above the LED chip 14-1. The increased dispensing pressure may effectively be controlled to form the depression 46 at a top surface of the lens 12-1. Adjustments to the dispensing pressure and/or width of the nozzle orifice may be utilized to tailor dimensions, such as a depth and/or width of the depression 46, for achieving specific light emission patterns. The lenses 12-2 and 12-2 may also be dispensed through a nozzle, but without dispensing conditions that form the depression 46. Accordingly, the LED package 44 may be provided with a variety of lens shapes for different LED chips 14-1 to 14-3, including complex shapes like the lens 12-1. Moreover, shapes of lenses 12-1 to 12-3 may be varied according to corresponding LED emission wavelengths and/or relative position along the array of LED chips 14-1 to 14-3. As with other embodiments, each of the LED chips 14-1 to 14-3 may be part of separate serial strings that are individual addressable or dynamically adjust color and/or far-field patterns in aggregate emissions of light from the LED package 44. The complex shape for the lens 12-1 may be implemented for any of the lenses of the embodiments of FIGS. 1A to 5.

Figure 7:
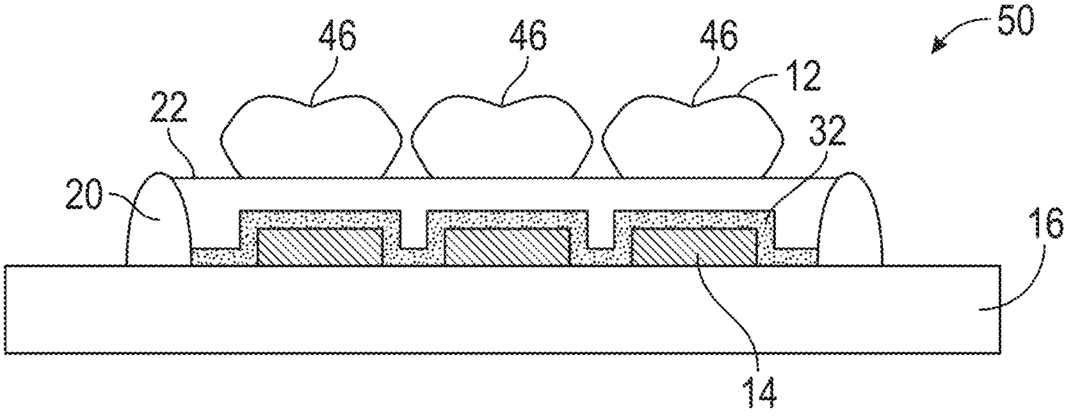
FIG. 7 is a cross-sectional view of an LED package similar to the LED package of FIGS. 1A to 1C for embodiments where each lens includes a complex shape.

FIG. 7 is a cross-sectional view of an LED package 50 similar to the LED package 10 of FIGS. 1A to 1C for embodiments where each lens 12 includes a complex shape. By way of example, each lens 12 may be formed with a shape similar to the lens 12-1 as described above with respect to FIG. 6. Accordingly, each lens 12 in FIG. 7 for each LED chip 14 may be configured to provide highest relative intensities that are offset form a center of the lens 12, thereby providing a wide distribution of light from each LED chip 14. In certain embodiments, such lens shapes may be referred to as batwing shapes based on corresponding emission patterns. By moving highest relative intensities for each LED chip 14 off-center, the appearance of hot spots in aggregate emissions of the overall LED package 50 may be reduced.

Figure 8:
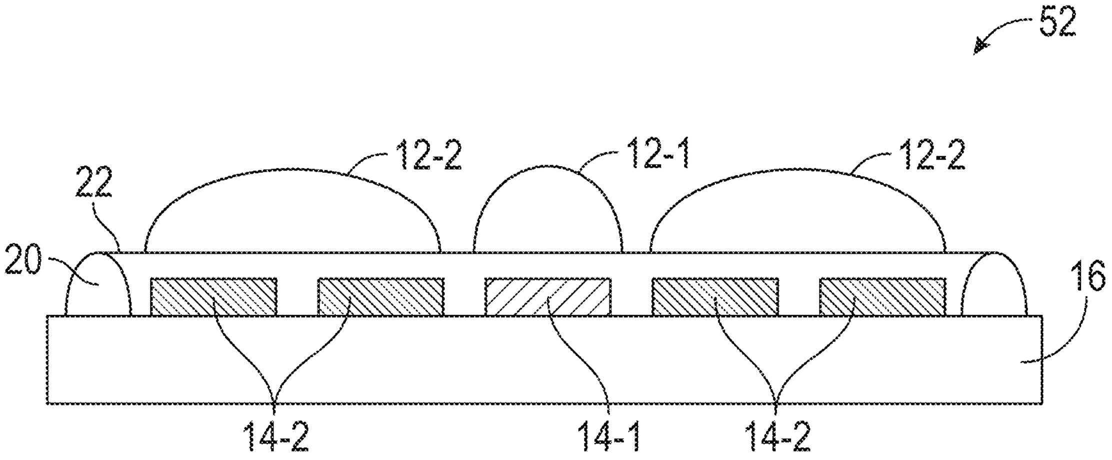
FIG. 8 is a cross-sectional view of an LED package similar to the LED package of FIG. 5 for embodiments where at least one lens is formed over multiple LED chips.

FIG. 8 is a cross-sectional view of an LED package 52 similar to the LED package 42 of FIG. 5 for embodiments where at least one lens 12-2 is formed over multiple LED chips 14-2. As illustrated, a single one of the lenses 12-2 may form a dome or generally hemispherical shape that covers multiple ones of the LED chips 14-2. Such an arrangement may be advantageous for evening out emissions for multiple ones of the LED chips 14-2 having the same emission colors in various sections of the LED package 52. The LED chip 14-1 may have a single lens 12-1 for laterally spreading its emissions for increased color mixing with the LED chips 14-2. The lens 12-2 may further have the complex shape described above for the lens 12-1 of FIG. 6 or the lens 12 of FIG. 7. As with other embodiments, each of the LED chips 14-1 to 14-2 may form part of separate serial strings that are individual addressable or dynamically adjust color and/or far-field patterns in aggregate emissions of light from the LED package 52.

Figure 9:
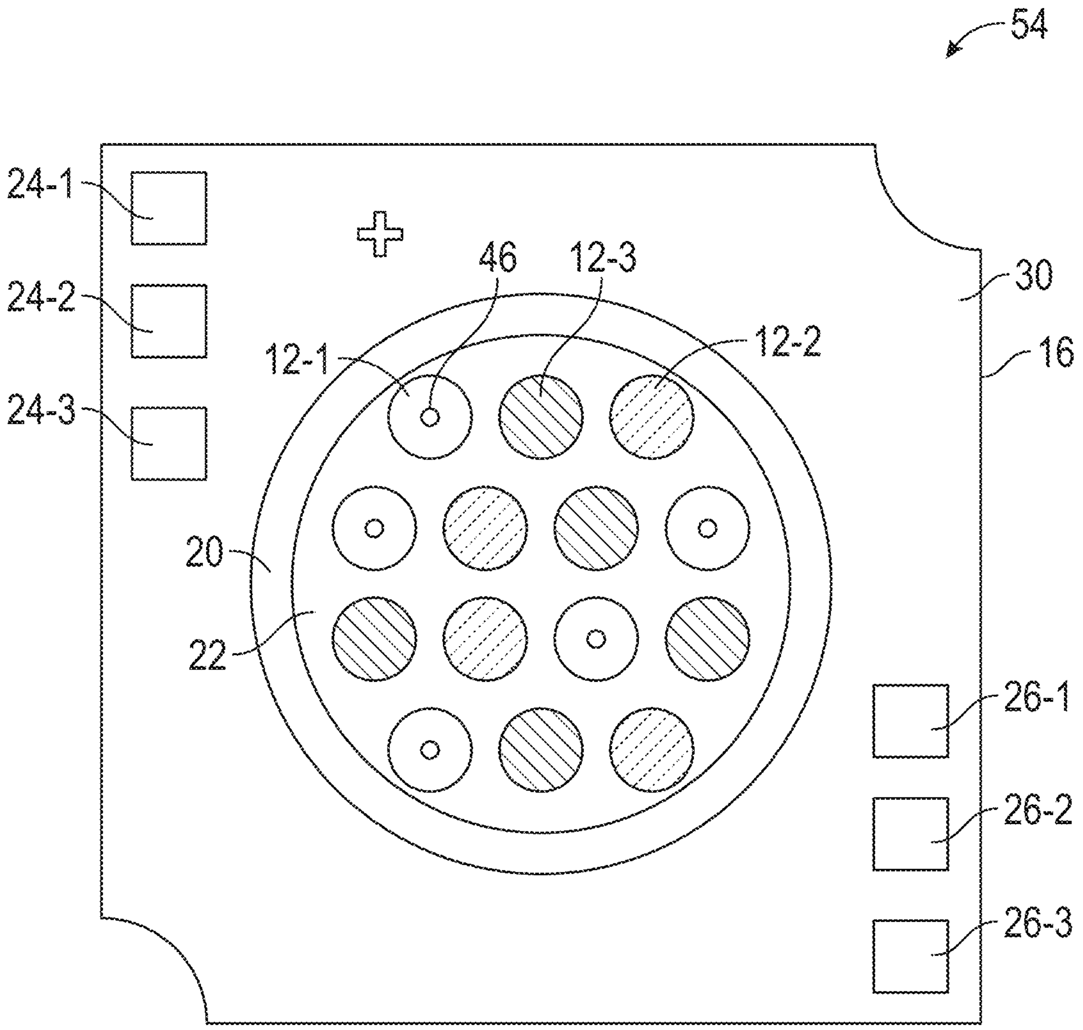
FIG. 9 is a top view of an LED package similar to the LED package of FIGS. 1A to 1C for embodiments with multiple individually addressable strings of LED chips.

FIG. 9 is a top view of an LED package 54 similar to the LED package of FIGS. 1A to 1C for embodiments with multiple individually addressable strings of LED chips. By way of example, the LED package 54 includes the multiple lens types as described above with respect to FIG. 6. That is, the lens 12-1 is configured to provide a wide-angle emission pattern with peak intensity that is offset from center, the lens 12-2 is configured to provide an emission pattern that is narrower than the lens 12-1, and the lens 12-3 is configured to provide a narrowest emission pattern as compared to the other lenses 12-1, 12-2. In certain embodiments, the lens 12-1 forms a complex shape, such as an inwardly tapered width and/or the depression 46, the lens 12-2 forms a generally hemispherical shape, and the lens 12-3 forms a generally bullet shape. Each of the lenses 12-1 to 12-3 is positioned over a corresponding LED chip (i.e., 14 of FIGS. 1A and 6). In certain embodiments, the LED chips for each type of lens 12-1 to 12-3 are electrically connected in series. For example, a first string of LED chips with the lens 12-1 are serially connected between package bond pads 24-1 and 26-1, a second string of LED chips with the lens 12-2 are serially connected between package bond pads 24-2 and 26-2, and a third string of LED chips with the lens 12-3 are serially connected between package bond pads 24-3 and 26-3. In certain embodiments, a common anode or a common cathode arrangement may be provided such that the package bond pads 24-1 to 24-3 or the package bond pads 26-1 to 26-1 are combined into a single package bond pad. In either configuration, each string of LED chips may be individual addressable to provide the capability to dynamically adjust color and/or far-field patterns in aggregate emissions of light from the LED package 54. The multiple string principles described for FIG. 9 are applicable to any of the previously described embodiments with respect to FIGS. 1A to 8.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A light-emitting diode (LED) package comprising:
a submount;
an array of LED chips on the submount;
an encapsulant on the submount and covering the array of LED chips; and
an array of lenses on a top surface of the encapsulant;
wherein the encapsulant comprises a first silicone, and the array of lenses comprises a second silicone that is different than the first silicone, and the first silicone comprises a lower coefficient of thermal expansion than the second silicone.

2. The LED package of claim 1, further comprising a light-altering material on the submount, the light-altering material extending about a perimeter of the array of LED chips to form a dam for retaining the encapsulant.

3. The LED package of claim 1, wherein the array of lenses is formed on the top surface of the encapsulant above the array of LED chips.

4. The LED package of claim 1, wherein each discrete lens of the array of lenses is provided on a different portion of the encapsulant relative to a corresponding LED chip of the array of LED chips.

5. The LED package of claim 1, further comprising a lumiphoric material configured to convert at least a portion of light generated by at least one LED chip of the array of LED chips.

6. The LED package of claim 5, wherein the lumiphoric material is provided within the encapsulant with an increased concentration along a top surface of the submount and along a top surface of the array of LED chips relative to the top surface of the encapsulant.

7. The LED package of claim 5, wherein the lumiphoric material comprises a pre-formed structure that is attached to the at least one LED chip of the array of LED chips.

8. The LED package of claim 1, wherein a first lens of the array of lenses forms a first shape with a lens width that decreases in a direction toward the encapsulant, and the first shape further comprises an inward depression in a direction toward a first LED chip of the array of LED chips.

9. A light-emitting diode (LED) package comprising:
a submount;
an array of LED chips on the submount, the array of LED chips comprising a first LED chip and a second LED chip;
an encapsulant on the submount and covering the array of LED chips, a first portion of a top surface of the encapsulant being vertically registered with the first LED chip relative to the submount, and a second portion of the top surface of the encapsulant being vertically registered with the second LED chip relative to the submount; and
a first lens on the first portion of the top surface of the encapsulant, and the second portion of the top surface of the encapsulant being devoid of any lens;
wherein the encapsulant comprises a first silicone, the first lens comprises a second silicone that is different than the first silicone, and the first silicone comprises a lower coefficient of thermal expansion than the second silicone.

10. The LED package of claim 9, wherein the first lens is centered with respect to the first LED chip.

11. The LED package of claim 9, wherein the first LED chip is configured to be independently addressable with respect to the second LED chip.

12. A light-emitting diode (LED) package comprising:
a submount;
an array of LED chips on the submount, the array of LED chips comprising a first LED chip and a second LED chip;
an encapsulant on the submount and covering the array of LED chips, a first portion of a top surface of the encapsulant being vertically registered with the first LED chip relative to the submount, and a second portion of the top surface of the encapsulant being vertically registered with the second LED chip relative to the submount;
a first lens on the first portion of the top surface of the encapsulant, the first lens forming a first shape; and
a second lens on the second portion of the top surface of the encapsulant, the second lens forming a second shape that is different than the first shape;

wherein the encapsulant comprises a first silicone, the first lens and the second lens comprise a second silicone that is different than the first silicone, and the first silicone comprises a lower coefficient of thermal expansion than the second silicone.

13. The LED package of claim 12, wherein the first shape comprises a lens width that decreases in a direction toward the first portion of the top surface of the encapsulant.

14. The LED package of claim 13, wherein the first shape further comprises an inward depression in a direction toward the first LED chip.

15. The LED package of claim 12, wherein the first shape comprises a lens width that decreases in a direction toward the first portion of the top surface of the encapsulant, and the second shape is hemispherical.

16. The LED package of claim 12, further comprising:

a third LED chip of the array of LED chips; and a third lens on a third portion of the top surface of the encapsulant that is vertically registered with the third LED chip, wherein the third lens forms a third shape that is different than the first shape and the second shape.

17. The LED package of claim 16, wherein the first LED chip, the second LED chip, and the third LED chip are individually addressable with respect to one another.

18. The LED package of claim 12, further comprising a third LED chip of the array of LED chips, wherein the second lens is further on a third portion of the top surface of the encapsulant that is vertically registered with the third LED chip.

* * * * *